US008736690B2

(12) United States Patent
Imanishi

(10) Patent No.: US 8,736,690 B2
(45) Date of Patent: May 27, 2014

(54) IMAGE PICKUP APPARATUS

(71) Applicant: FUJIFILM Corporation, Tokyo (JP)

(72) Inventor: Kazutaka Imanishi, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 14/045,254

(22) Filed: Oct. 3, 2013

(65) Prior Publication Data

US 2014/0036101 A1    Feb. 6, 2014

Related U.S. Application Data

(63) Continuation of application No. PCT/JP2012/059863, filed on Apr. 11, 2012.

(30) Foreign Application Priority Data

Apr. 12, 2011    (JP) .................................. 2011-088135

(51) Int. Cl.
*H04N 5/228*    (2006.01)
*H04N 5/232*    (2006.01)

(52) U.S. Cl.
CPC ......... *H04N 5/23258* (2013.01); *H04N 5/2328* (2013.01)
USPC ........................ 348/208.2; 348/208.7; 396/53

(58) Field of Classification Search
CPC .......... H04N 5/23248; H04N 5/23251; H04N 5/23254; H04N 5/23258; H04N 5/23261; H04N 5/23264; H04N 5/23267; H04N 5/2327; H04N 5/23274
See application file for complete search history.

(56) References Cited

U.S. PATENT DOCUMENTS

| 5,794,078 | A  | * | 8/1998 | Okazaki ........................... 396/50 |
| 6,097,896 | A  | * | 8/2000 | Usui ............................... 396/55 |
| 2008/0069552 | A1 | * | 3/2008 | Washisu ........................... 396/55 |
| 2010/0013937 | A1 | * | 1/2010 | Washisu et al. ............. 348/208.2 |
| 2010/0014847 | A1 | * | 1/2010 | Washisu et al. .................. 396/53 |
| 2011/0063458 | A1 | * | 3/2011 | Washisu et al. ............. 348/208.2 |

FOREIGN PATENT DOCUMENTS

JP    2010-286721 A    12/2010

* cited by examiner

*Primary Examiner* — Lin Ye
*Assistant Examiner* — Dennis Hogue
(74) *Attorney, Agent, or Firm* — Birch, Stewart, Kolasch & Birch, LLP

(57) ABSTRACT

At the time of occurrence of camera shake, an angular velocity sensor detects an angular velocity. A rotation angle calculator integrates the angular velocity to calculate angle camera shake. A translational acceleration calculator subtracts an internal acceleration caused during operation of a lens unit from a first translational acceleration detected by an acceleration sensor, so as to calculate a second translational acceleration. A translational velocity calculator integrates the second translational acceleration to calculate a translational velocity. A rotation radius calculator calculates a rotation radius based on the angular velocity and the translational velocity. A shake amount calculator calculates a camera shake amount based on the angle camera shake and the rotation radius. An actuator drives a camera shake correction lens in a direction for canceling the camera shake amount.

14 Claims, 8 Drawing Sheets

IMAGE PICKUP APPARATUS

This application is a Continuation of PCT/JP2012/059863 filed on Apr. 11, 2012, which claims priority under 35 U.S.C. 119(a) to Patent Application No. 2011-088135 filed in Japan, all which are hereby expressly incorporated by reference into the present application.

BACKGROUND OF THE INVENTION

1. Field of the Invention

The present invention relates to an image pickup apparatus having a camera shake correction function.

2. Description of the Related Art

As an image pickup apparatus, as well known, there are a digital camera, a monitoring camera, and the like. The image pickup apparatus is generally provided with an automatic focusing mechanism and an automatic exposure control mechanism. Recently, the image pickup apparatus is further provided with a camera shake correction mechanism so as to suppress image quality degradation of a captured image occurring due to camera shake. The camera shake occurs when the image pickup apparatus rotates or shifts in accordance with movement of hands or arms holding the image pickup apparatus. The camera shake is a low-frequency vibration on the order of 1 to 10 Hz. Accordingly, for the purpose of correcting the camera shake, the low-frequency vibration of the image pickup apparatus is detected, and then an imaging device or a correction lens contained in an image pickup lens is caused to move so as to cancel the low-frequency vibration. Thereby, occurrence of image blur on a screen is suppressed.

The image blur due to the rotation of the image pickup apparatus (hereinafter referred to as angle camera shake) occurs when a release button is depressed or the like. On the other hand, the image blur due to parallel shifting of the image pickup apparatus (hereinafter referred to as shift camera shake) occurs when arms holding a camera move, for example. In macro image capturing at high magnification or the like, the shift camera shake affects the captured image adversely more than the angle camera shake. The angle camera shake can be detected by an angular velocity sensor. However, it is difficult for the angular velocity sensor to accurately detect the shift camera shake. In view of the above, recently, in addition to the angular velocity sensor, an acceleration sensor is provided to the image pickup apparatus, so as to detect an acceleration of the image pickup apparatus due to the parallel shifting thereof and suppress occurrence of the shift camera shake based on the detected acceleration (see Japanese Patent Laid-Open Publication No. 2010-286721 and US Patent Application Publication No. 2011/0063458 corresponding to Japanese Patent Laid-Open Publication No. 2010-025961).

In the image pickup apparatus disclosed in each of Japanese Patent Laid-Open Publication No. 2010-286721 and US Patent Application Publication No. 2011/0063458, it is possible to correct both the angle camera shake and the shift camera shake. However, it is only when mechanical movable sections in the image pickup apparatus do not operate that the angle camera shake and the shift camera shake can be corrected with precision. It is because, while the movable sections operate, vibration of the image pickup apparatus in accordance with an internal acceleration thereof due to the movable sections results in noise in the angular velocity sensor and the acceleration sensor. In a lens unit, the mechanical movable sections are a magnification lens, a focusing lens, an aperture stop, and the like. In the image pickup apparatus disclosed in each of Japanese Patent Laid-Open Publication No. 2010-286721 and US Patent Application Publication No. 2011/0063458, while the lens unit operates, the camera shake correction mechanism is suspended, and after the operation of the lens unit is stopped, the operation of the camera shake correction mechanism is resumed.

In most cases, while performing zooming operation, focusing, exposure control, or the like, a user observes a through-image on a monitor screen or looks through an optical viewfinder, so as to determine the framing of an image to be captured. As the camera shake correction mechanism is suspended while the lens unit operates, the image quality of the through-image or the image looked through the viewfinder degrades due to the camera shake, and thereby it becomes harder to determine the framing of the image to be captured. In the macro image capturing, in particular, since the magnification is high, degradation of the image quality is prominent even when slight camera shake occurs. Further, in moving-image capturing, the zooming operation or the like is performed in conjunction with the image capturing. Thus, there is a problem in that the image quality of the moving image degrades since the camera shake correction mechanism is suspended every time the zooming operation or the like is performed.

SUMMARY OF THE INVENTION

An object of the present invention is to provide an image pickup apparatus capable of performing camera shake correction with precision even during operation of mechanical movable sections.

To achieve the above and other objects, an image pickup apparatus of the present invention includes an angular velocity detector, an acceleration detector, a translational acceleration calculator, a translational velocity calculator, a rotation radius calculator, a rotation angle calculator, a shake amount calculator, and a driver. Further, an imaging device disposed on an imaging optical axis, an imaging optical system for forming an image of a subject on the imaging device, and a movable section accompanying occurrence of an internal acceleration during operation thereof are disposed in the image pickup apparatus. The angular velocity detector detects an angular velocity in accordance with rotation of the image pickup apparatus. The acceleration detector detects a first translational acceleration in accordance with translational movement of the image pickup apparatus. The translational acceleration calculator calculates a second translational acceleration caused by an external factor on the image pickup apparatus by subtracting the internal acceleration from the first translational acceleration. The translational velocity calculator calculates a translational velocity by integrating the second translational acceleration. The rotation radius calculator calculates a rotation radius based on the angular velocity and the translational velocity. The rotation angle calculator calculates a rotation angle by integrating the angular velocity. The shake amount calculator calculates a camera shake amount containing an angle camera shake and an shift camera shake based on the rotation angle and the rotation radius, the angle camera shake occurring due to rotation of the imaging optical axis, and the shift camera shake occurring due to parallel shifting of the imaging optical axis. The driver moves the imaging optical system as a whole or an optical component constituting the imaging optical system, or moves the imaging device, in a direction for canceling the camera shake amount, so as to correct the angle camera shake and the shift camera shake.

It is preferable that the image pickup apparatus further includes a high-pass filter for removing a component of a gravitational acceleration from the first translational acceleration. In this case, the translational acceleration calculator compares a frequency component of the internal acceleration with a cut-off frequency of the high-pass filter. When the frequency component of the internal acceleration is lower than the cut-off frequency, the translational acceleration calculator outputs the first translational acceleration as the second translational acceleration without subtracting the internal acceleration from the first translational acceleration. When the frequency component of the internal acceleration is higher than the cut-off frequency, the translational acceleration calculator outputs a value obtained by subtracting the internal acceleration from the first translational acceleration as the second translational acceleration.

The translational acceleration calculator preferably acquires position information of the movable section during the operation of the movable section, and differentiates the portion information twice, so as to calculate the internal acceleration.

It is usual that the movable section is driven by a predetermined specific driving pattern. Accordingly, it is preferable that the image pickup apparatus further includes an internal acceleration calculator for calculating the internal acceleration based on the driving pattern.

As the specific driving pattern, there is a pattern of velocity control in which a graph illustrating a velocity change is in the shape of a trapezoid. In this case, the internal acceleration calculator calculates the internal acceleration based on a parameter for determining an aspect of the trapezoidal velocity control.

As the specific driving pattern, there is a pattern based on a cubic or higher-order spline function. In this case, the internal acceleration calculator calculates the internal acceleration by differentiating the spline function twice.

As the driving pattern, there is a pattern based on the following quintic function expressed by using an initial position $x_0$, a target position $x_f$, a time t, and a target arrival time $t_f$. In this case, the internal acceleration calculator calculates the internal acceleration by differentiating the quintic function twice.

$$x(t) = x_0 - 6\frac{x_0 - x_f}{t_f^5}t^5 + 15\frac{x_0 - x_f}{t_f^4}t^4 - 10\frac{x_0 - x_f}{t_f^3}t^3$$

The internal acceleration often occurs in a lens unit. One of the movable sections is a magnification lens moved along the imaging optical axis at the time of zooming, or a lens driving mechanism for driving the magnification lens.

Another one of the movable sections is a focusing lens moved along the imaging optical axis at the time of focusing, or a lens driving mechanism for driving the focusing lens.

Further another one of the movable sections is an aperture stop device for forming an aperture opening on the imaging optical axis by plural stop blades, or an aperture driving mechanism for moving the stop blades.

As the movable section, there is an optical component disposed in an optical path of a viewfinder.

It is preferable that the shake amount calculator acquires an image magnification and a focal length, and calculates the camera shake amount by using the image magnification, the focal length, the rotation angle, and the rotation radius.

The driver preferably corrects the angle camera shake and the shift camera shake by driving a camera shake correction lens contained in the imaging optical system.

According to the present invention, it is possible to perform camera shake correction with precision without being influenced by the movable sections, even while the zooming, focusing, or aperture control is performed.

BRIEF DESCRIPTION OF THE DRAWINGS

The above objects and advantages of the present invention will become more apparent from the following detailed description when read in connection with the accompanying drawings, in which.

DETAILED DESCRIPTION OF THE PREFERRED EMBODIMENT(S)

[First Embodiment]

Figure 1:
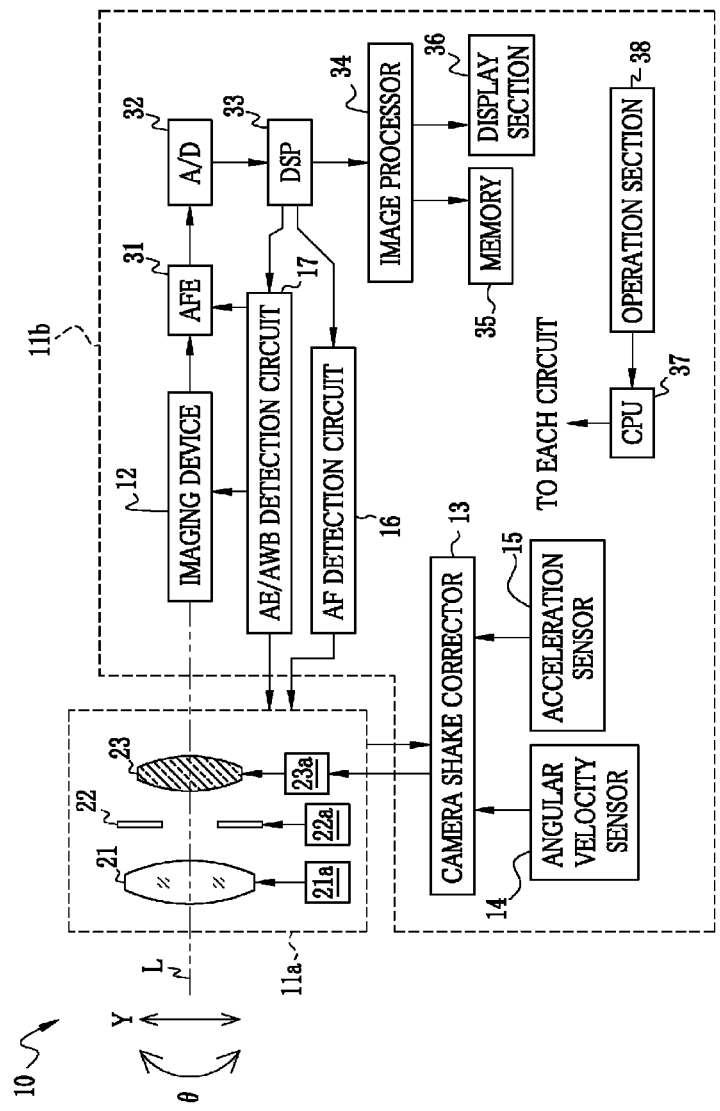
FIG. 1 is a block diagram illustrating a structure of an image pickup apparatus.

An image pickup apparatus 10 shown in FIG. 1 is used as a digital camera, a security camera, or the like. The image pickup apparatus 10 includes a lens unit 11a and a camera body 11b. In the case of a compact digital camera, the lens unit 11a is provided to be movable in and out of the camera body 11b. In the case of a digital single-lens reflex camera, the lens unit 11a is detachably attached to the camera body 11b.

The camera body 11b includes an imaging device 12, a camera shake corrector 13, a angular velocity sensor 14, an acceleration sensor 15, an AF (automatic focus) detection circuit 16, an AE/AWB (automatic exposure/automatic white balance) detection circuit 17, an image processing system mainly consisting of an image processor 34, a CPU 37, and the like.

The lens unit 11a has an imaging optical system constituted by a lens group 21, an aperture stop 22, and a camera shake correction lens 23. The lens group 21 is depicted as one lens for the sake of simplicity, but in fact, the lens group 21 includes plural lens groups. The plural lens groups contain a zooming lens group (magnification lens and correction lens) moving along an optical axis L at the time of zooming, and a focusing lens moving along the optical axis L at the time of focusing, and the like. Note that, in the case of a step-zoom lens constituted of two lens groups, the focusing lens also functions as the camera correction lens.

A movable lens such as the magnification lens is driven by an actuator 21*a* such as a voice coil motor (VCM), a stepping motor, or the like. In step zooming, the zooming operation and the focusing operation are alternately performed, and therefore one actuator 21*a* is used. In the case of using a normal zoom lens, there two kinds of actuators, namely, an actuator for the zooming operation and an actuator for the focusing operation. The actuator for the zooming operation is driven through a driver (not shown) by the CPU 37 in response to operation of a zoom button of an operation section 38. The actuator for the focusing operation is driven based on a focus signal input from the AF detection circuit 16 or the like.

The aperture stop 22 has plural movable stop blades. The size of an aperture opening formed on the optical axis L is adjusted by the aperture stop 22 so as to control an amount of incident light. Each of the stop blades is driven by an actuator 22*a* such as a voice coil motor (VCM), a stepping motor, or the like. The actuator 22*a* is driven based on a luminance signal from the AE/AWB detection circuit 17.

The camera shake correction lens 23 is disposed so as to be movable in a direction vertical to the optical axis L, and caused to move in a direction for canceling camera shake at the time of occurrence of camera shake in the image pickup apparatus 10, the camera shake leading to angle camera shake or shift camera shake. The camera shake correction lens 23 is driven by an actuator 23*a* such as a voice coil motor (VCM), a stepping motor, or the like. The moving direction and the moving amount of the camera shake correction lens 23 is controlled by the camera shake corrector 13.

For example, a CCD image sensor is used as the imaging device 12. The imaging device 12 captures an image formed by the imaging optical system of the lens unit 11*a*. Plural pixels are arranged in a predetermined alignment on an imaging surface of the imaging device 12. Each of the pixels photoelectrically converts light from a subject, and accumulates a signal charge. The signal charge of each of the pixels of the imaging device 12 is read out in chronological order, and then sent as an imaging signal to an analog front end (AFE) 31. As well known, the AFE 31 removes noise by performing correlated double sampling, performs white balance correction, and the like. The imaging signal from the AFE 31 is converted into image data by an A/D converter 32, and then sent to a digital signal processor (DSP) 33.

The DSP 33 functions as an image quality correction processor for subjecting the input image data to signal processing such as gradation correction processing and gamma correction processing, and a compression/decompression processor for compressing/decompressing the image data in accordance with a predetermined format such as JPEG. Further, after being subjected to the various kinds of correction processing in the DSP 33, the image data is subjected to image processing such as edge enhancement processing in the image processor 34. After being subjected to the image processing in the image processor 34, the image data is stored in a memory 35, or displayed on a display section 36.

The display section 36 consists of LCD and the like. During framing operation, a moving image is captured, and the moving image consisting of a few pixels (namely, through-image) is displayed on the display section 36. Further, a still image or a moving image stored in a storage device such as a memory card (not shown in the drawing) is displayed or reproduced on the display section 36. Additionally, during mode setting, an operation menu, a setting menu, or the like is displayed on the display section 36. Such a menu can be selected with use of the operation section 38.

The AF detection circuit 16 detects a focal length based on the image data output from the DSP 33. The AF detection circuit 16 extracts a high frequency component from a predetermined AF detection area in the image data, and outputs an evaluation value obtained by adding up the high frequency components. With reference to the obtained evaluation value, a focusing lens of the imaging optical system is caused to move, so as to detect an in-focus position at which the evaluation value becomes maximum. At the in-focus position, contrast in the AF detection area becomes maximum. The focusing lens is set to the detected in-focus position.

The AE/AWB detection circuit 17 calculates a white balance correction amount and an exposure amount (namely, an aperture value and a shutter speed) based on the image data output from the DSP 33. The AFE 31 sets a gain of an amplifier for two colors in accordance with the white color balance correction amount, and controls the color balance in the imaging signal. Further, the lens unit 11*a* adjusts the aperture opening of the aperture stop 22 in accordance with the aperture value. Furthermore, the lens unit 11*a* adjusts a charge accumulation time of the imaging device 12 in accordance with the shutter speed.

Upon occurrence of camera shake of the image pickup apparatus 10, a measurement system of the angular velocity sensor 14 detects an angular velocity ω due to rotation of the image pickup apparatus 10, and a measurement system of the acceleration sensor 15 detects a first translational acceleration Acc1 due to parallel shifting of the image pickup apparatus 10. The camera shake corrector 13 calculates the angle camera shake θ and the shift camera shake Y based on the angular velocity ω and the first translational acceleration Acc1, respectively. A camera shake amount δ is calculated based on the two kinds of camera shakes, and sent to the actuator 23*a*. The actuator 23*a* drives the camera shake correction lens 23 so as to cancel image blur in accordance with the camera shake amount δ. Accordingly, in the image pickup apparatus 10, the angle camera shake θ and the shift camera shake Y are collected at the same time by moving the camera shake correction lens 23.

The CPU 37 comprehensively controls each component of the image pickup apparatus 10 in response to the input from the operation section 38. The operation section 38 consists of a power button, a release button depressed by two-steps, namely, by half depression and full depression, a menu button, a function key, and the like. When the release button is half-depressed, for example, the CPU 37 causes the AF detection circuit 16 to perform automatic focus control and causes the AE/AWB detection circuit 17 to automatically control the exposure amount.

Figure 2:
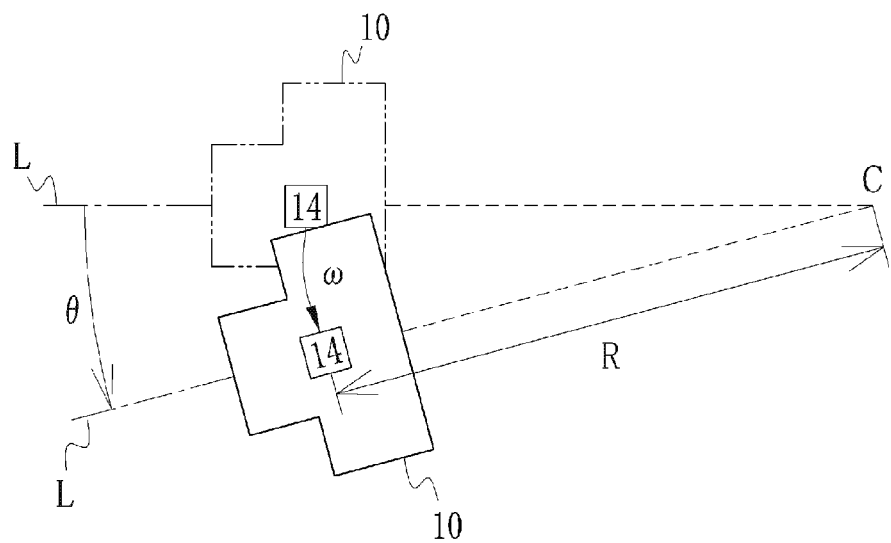
FIG. 2 is an explanatory view illustrating an aspect of angle camera shake.
Figure 3:
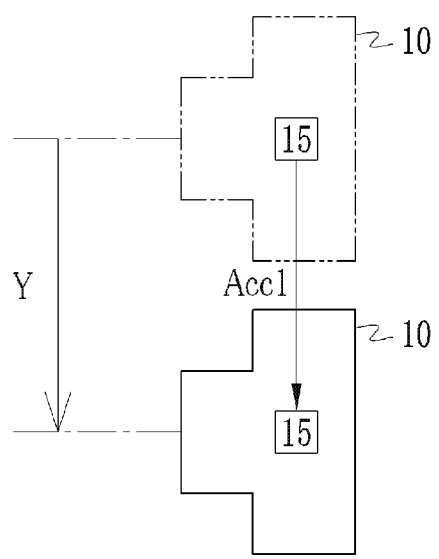
FIG. 3 is an explanatory view illustrating an aspect of shift camera shake.

As shown in FIG. 2, the angle camera shake θ is caused by rotation of the optical axis L about a rotation center C, and calculated by integrating the angular velocity ω. A translational velocity V is calculated by integrating the first translational acceleration Acc 1. A rotation radius R is a length from the rotation center C to the angular velocity sensor 14, for example, and calculated using the translational velocity V and the angular velocity w based on a relationship expressed by R=V/ω. Additionally, as shown in FIG. 3, the shift camera shake Y is caused by the parallel shifting of the image pickup apparatus 10 in a plane vertical to the optical axis L, and calculated using the angle camera shake θ and the rotation radius R based on a relationship expressed by Y=R·θ.

Note that, the camera shake amount δ calculated by the camera shake corrector 13 is expressed by δ=(1+β)fθ+βY using the angle camera shake θ, the shift camera shake Y, an image magnification β, and the focal length f. Since the relationship expressed by Y=Rθ is established as described above, the camera shake amount δ is expressed by δ=(1+β)fθ+βRθ. Therefore, in order to calculate the camera shake amount δ, it is necessary to accurately calculate the angle camera shake θ and the rotation radius R. In particular, while the lens unit 11a operates, namely, while the zooming, focusing, or aperture control is performed, due to the operation of the actuator 21a or 22a as the drive source for the zooming, focusing, or aperture control, noise occurs in the angular velocity sensor 14 and the acceleration sensor 15.

Figure 4:
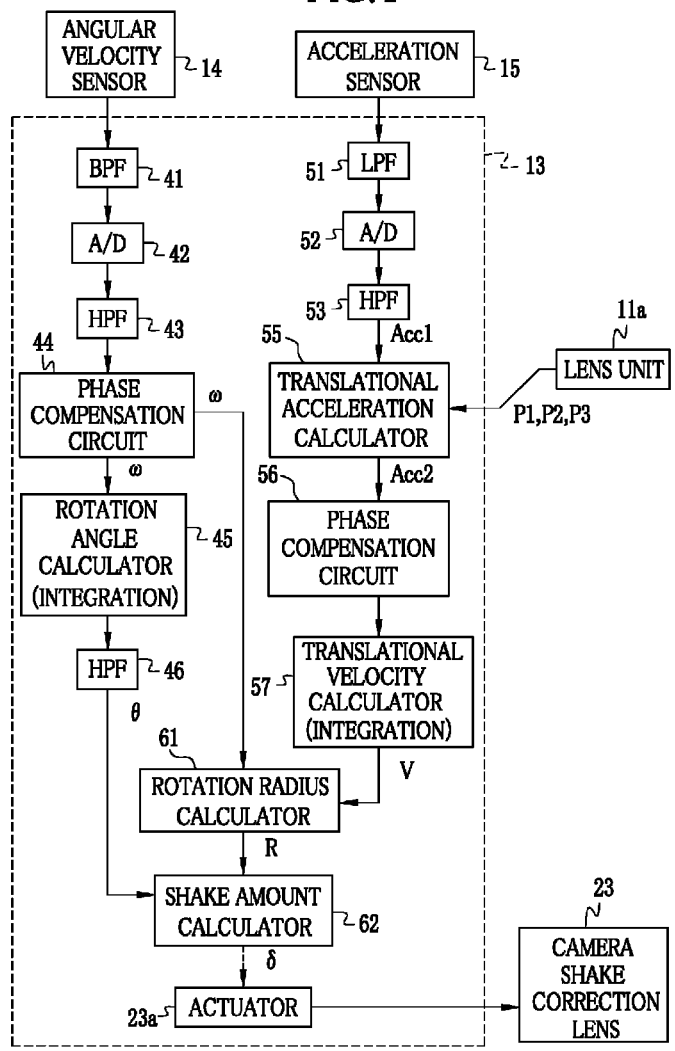
FIG. 4 is a block diagram illustrating a camera shake correction mechanism.

It is necessary for the camera shake corrector 13 to accurately calculate the camera shake amount 6 without being influenced by the noise due to the movable sections of the lens unit 11a even during the operation of the movable sections. Accordingly, as shown in FIG. 4, the camera shake corrector 13 includes a band-pass filter (BPF) 41, high-pass filters (HPFs) 43, 46, and 53, a rotation angle calculator 45, a low-pass filter (LPF) 51, a translational acceleration calculator 55, a translational velocity calculator 57, a rotation radius calculator 61, a shake amount calculator 62, and the like.

An output signal from the angular velocity sensor 14 (hereinafter referred to as angular velocity signal) is input to the BPF 41. The BPF 41 extracts a component in a frequency band of the angle camera shake θ occurring due to the camera shake (for example, on the order of 1 to 10 Hz) from the output signal from the angular velocity sensor 14, and sends the extracted component to an A/D converter 42. The A/D converter 42 converts the input angular velocity signal in the predetermined frequency band into a digital signal, and inputs the digital signal to the HPF 43. The HPF 43 removes a (DC) component of the angular velocity signal. The angular velocity signal from which the DC component is cut is input to a phase compensation circuit 44. Thereafter, the phase-compensated angular velocity signal is output as the angular velocity ω. The angular velocity ω is input to the rotation angle calculator 45 and the rotation radius calculator 61. The rotation angle calculator 45 integrates the angular velocity ω to obtain a rotation angle. The HPF 46 removes a DC component from the rotation angle to obtain the angle camera shake θ. Then, the angle camera shake θ is input to the shake amount calculator 62.

In contrast, the translational acceleration output from the acceleration sensor 15 (namely, translational acceleration signal) is input to the LPF 51. The LPF 51 removes noise from the translational acceleration. An A/D converter 52 converts the translational acceleration into a digital signal, and then outputs the digital signal to the HPF 53. The HPF 53 is a filter for removing an acceleration component caused by the gravity (namely, gravitational acceleration component). A cut-off frequency fc of the HPF 53 is about 1 Hz. The translational acceleration from which the gravitational acceleration component is removed by the HPF 53 is input as the first translational acceleration Acc1 to the translational acceleration calculator 55.

The translational acceleration calculator 55 is connected to the lens unit 11a so as to obtain the drive status of the movable sections in the lens unit 11 such as position information P1 of the magnification lens, position information P2 of the focusing lens, and aperture information P3 of the aperture stop 22. The translational acceleration calculator 55 calculates an acceleration caused inside the image pickup apparatus 10 (hereinafter referred to as internal acceleration) in accordance with the drive status of the lens unit 11a by referring to the obtained pieces of information P1, P2, and P3. The internal acceleration is removed from the first translational acceleration Acc1 so as to obtain a second translational acceleration Acc2.

The phase compensation circuit 56 compensates the phase of the second translational acceleration Acc2, and then outputs the phase-compensated second translational acceleration Acc2 to the translational velocity calculator 57. The translational velocity calculator 57 integrates the second translational acceleration Acc2 to calculate the translational velocity V of the shift camera shake Y. The obtained translational velocity V of the shift camera shake Y is input to the rotation radius calculator 61.

The rotation radius calculator 61 calculates the rotation radius R (see FIG. 2) due to the angle camera shake θ caused in the image pickup apparatus 10 based on the angular velocity ω and the translational velocity V. Specifically, the rotation radius calculator 61 calculates a rotation radius R' by dividing the translational velocity V by the angular velocity ω (R'=V/ω). A rotation center C' is defined by the rotation radius R' thus calculated. However, the rotation center C' defined by the rotation radius R' does not reflect an optical state of the imaging optical system of the lens unit 11a, and therefore the rotation center C' is not necessarily accurate. Accordingly, the rotation radius calculator 61 corrects the rotation radius R' and the rotation center C' based on information such as a position of the acceleration sensor 15, a principal point of the imaging optical system, a subject distance, and the like from the CPU 37, so as to calculate the rotation center C and the rotation radius R which reflect the optical state of the imaging optical system and therefore are accurate. The rotation radius R calculated by the rotation radius calculator 61 is input to the shake amount calculator 62.

The shake amount calculator 62 receives the angle camera shake θ from the HPF 46 and the rotation radius R from the rotation radius calculator 61. Additionally, the shake amount calculator 62 receives the image magnification β and the focal length f from the CPU 37. The shake amount calculator 62 calculates the camera shake amount δ using the angle camera shake θ, rotation radius R, the image magnification β, and the focal length f based on the mathematical expression expressed by δ=(1+β)fθ+βRθ. Here, the shake amount calculator 62 corrects the value of the rotation radius R by gain correction based on sensitivity of the acceleration sensor 15. Note that "fθ" in the mathematical expression of the camera shake amount δ is referred to as sensitivity. The actuator 23a drives the camera shake correction lens 23 so as to cancel the camera shake amount δ calculated by the shake amount calculator 62. Accordingly, occurrence of image blur due to the camera shake is suppressed.

The image pickup apparatus 10 can correct the camera shake continuously even while the movable sections such as the lens group 21 and the aperture stop 22 contained in the lens unit 11a operate. This is because the translational acceleration calculator 55 removes the internal acceleration caused by the operation of the lens group 21 or the aperture stop 22 from the first translational acceleration Acc1 based on the output value from the acceleration sensor 15 such that influence by the movable sections in the image pickup apparatus 10 is eliminated.

Figure 5:
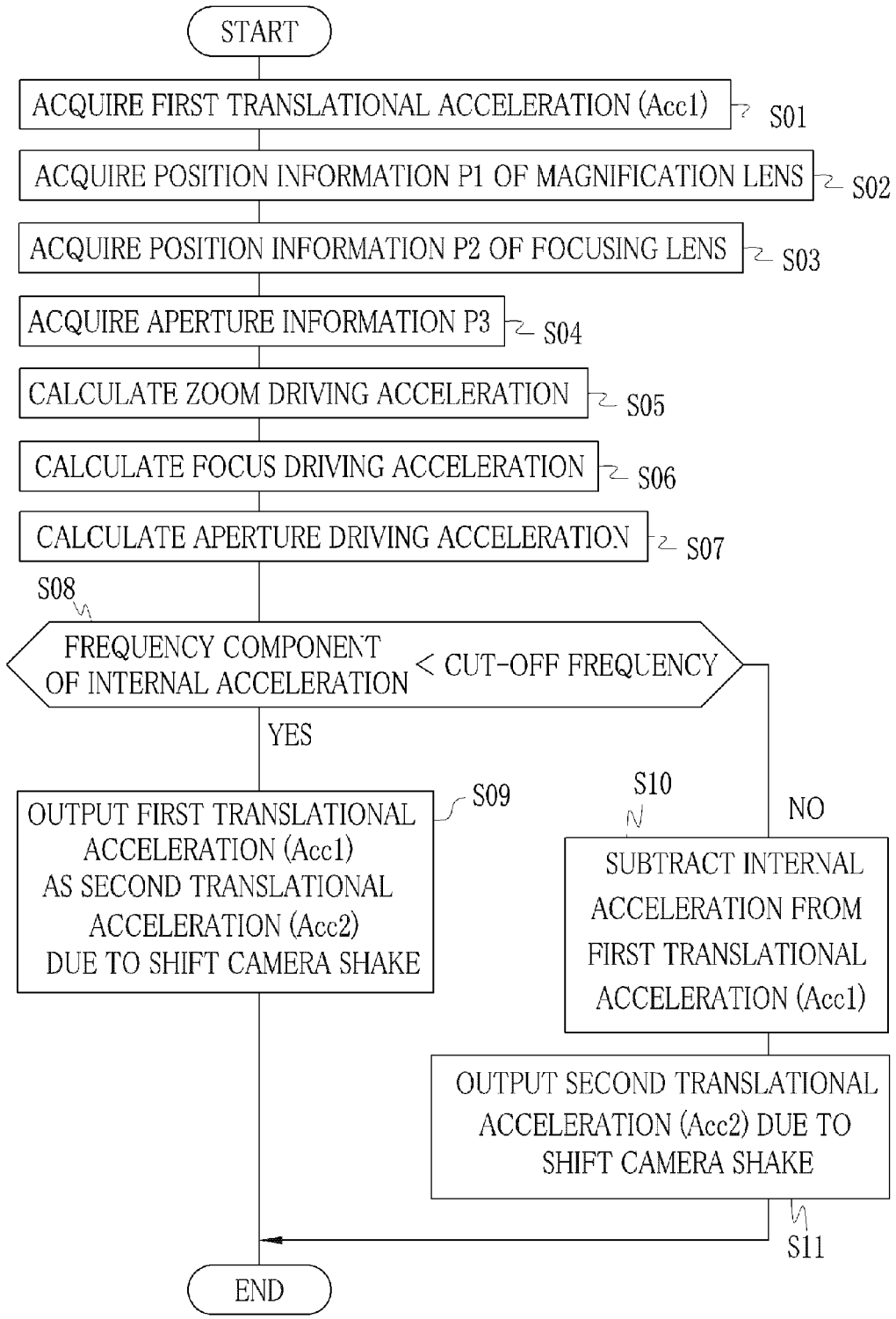
FIG. 5 is a flow chart illustrating a procedure of camera shake correction.

As shown in FIG. 5, the translational acceleration calculator 55 acquires the first translational acceleration Acc1 from the HPF 53 (step S01). Concurrently, the translational acceleration calculator 55 acquires the portion information P1 of the magnification lens, the position information P2 of the focusing lens, and the aperture information P3, as the information of the lens group 21, respectively (step S02 to step S04). Then, the position information P1 of the magnification lens is differentiated twice so as to calculate the internal acceleration due to the driving of the magnification lens (hereinafter referred to as zoom driving acceleration) (step S05). In the similar manner, the position information P2 of the focusing lens is differentiated twice so as to calculate the internal acceleration due to the driving of the focusing lens (hereinafter referred to as focus driving acceleration) (step S06). Further, the internal acceleration due to the driving of the aperture stop 22 (hereinafter referred to as aperture driving acceleration) is calculated based on the aperture information P3 (step S07).

Here, each of the information P1, the information P2, and the information P3 can be expressed by a quintic function x(t) using an initial position $x_0$, a target position $x_f$, a time t, and a target arrival time $t_f$, as shown in Mathematical Expression 1 below, for example. The quintic function x(t) is defined such that change in the differential value of the acceleration in the moving time becomes minimum. Additionally, an internal acceleration α(t) obtained by differentiating the Mathematical Expression 1 twice is expressed by the Mathematical Expression 2 below.

$$x(t) = x_0 - 6\frac{x_0 - x_f}{t_f^5}t^5 + 15\frac{x_0 - x_f}{t_f^4}t^4 - 10\frac{x_0 - x_f}{t_f^3}t^3$$ [Mathematical Expression 1]

$$\alpha(t) = -120\frac{x_0 - x_f}{t_f^5}t^3 + 180\frac{x_0 - x_f}{t_f^4}t^2 - 60\frac{x_0 - x_f}{t_f^3}t$$ [Mathematical Expression 2]

Next, the translational acceleration calculator 55 compares the frequency components of the three kinds of calculated internal accelerations with the cut-off frequency fc of the HPF 53, respectively (step S08). In the case where the frequency components of all the three kinds of internal accelerations are lower than the cut-off frequency fc, the first translational acceleration Acc1 is output as the second translational acceleration Acc2 occurring due to the shift camera shake Y (external factor) (step S09). In contrast, in the case where the frequency component of the internal acceleration is higher than the cut-off frequency fc, the internal acceleration having the frequency component exceeding the cut-off frequency fc is subtracted from the first translational acceleration Acc1 input from the HPF 53 (step S10). Then, the value obtained by subtracting the internal acceleration from the first translational acceleration Acc1 is output as the second translational acceleration Acc2 occurring due to the shift camera shake Y (step S11).

The comparison between the cut-off frequency fc and the frequency component of the internal acceleration is conducted for each of the zoom driving acceleration, the focus driving acceleration, and the aperture driving acceleration. Further, the reason why the internal acceleration is not subtracted from the first translational acceleration Acc1 in the case where the frequency component of the internal acceleration is lower than the cut-off frequency fc is that, even if the noise due to the internal acceleration is superimposed and detected by the acceleration sensor 15, the noise due to the internal acceleration is removed by the HPF 53. Therefore, if the internal acceleration having the frequency component lower than the cut-off frequency fc is further subtracted from the first translational acceleration Acc1 by the translational acceleration calculator 55, there is caused redundant subtraction, which results in superimposition of the noise.

As described above, the translational acceleration calculator 55 accurately calculates the second translational acceleration Acc2 occurring due to the shift camera shake Y by removing the internal acceleration. Therefore, the translational velocity V and the rotation radius R calculated based on the second translational acceleration Acc2 are accurate values which are not influenced by the internal acceleration. Accordingly, it is possible to correct the camera shake with precision in the image pickup apparatus 10 even while the lens group 21 or the aperture stop 22 operates.

Note that, according to the above first embodiment, the translational acceleration calculator 55 is connected to the lens unit 11a so as to obtain the position information P1 of the magnification lens, the position information P2 of the focusing lens, and the aperture information P3. Such information can be also obtained from, for example, the AF detection circuit 16, the AE/AWB detection circuit 17, or the CPU 37. Further, the translational acceleration calculator 55 calculates the internal acceleration based on the information P1 of the magnification lens, the position information P2 of the focusing lens, and the aperture information P3. However, it is also possible to directly obtain the internal acceleration from the AF detection circuit 16, the AE/AWB detection circuit, or the CPU 37, instead of obtaining the position information and calculating the internal acceleration using the position information.

[Second Embodiment]

According to the above first embodiment, the translational acceleration calculator 55 accurately obtain the second translational acceleration Acc2 by comparing the frequency component of the internal acceleration with the cut-off frequency fc of the HPF 53 and subtracting the internal acceleration having the frequency component higher than the cut-off frequency fc from the first translational acceleration Acc1. However, the HPF 53 can be omitted. Further, it is usual that the movable sections are driven by a particular driving pattern. In this case, it is possible to obtain the internal acceleration based on the driving pattern.

Figure 6:
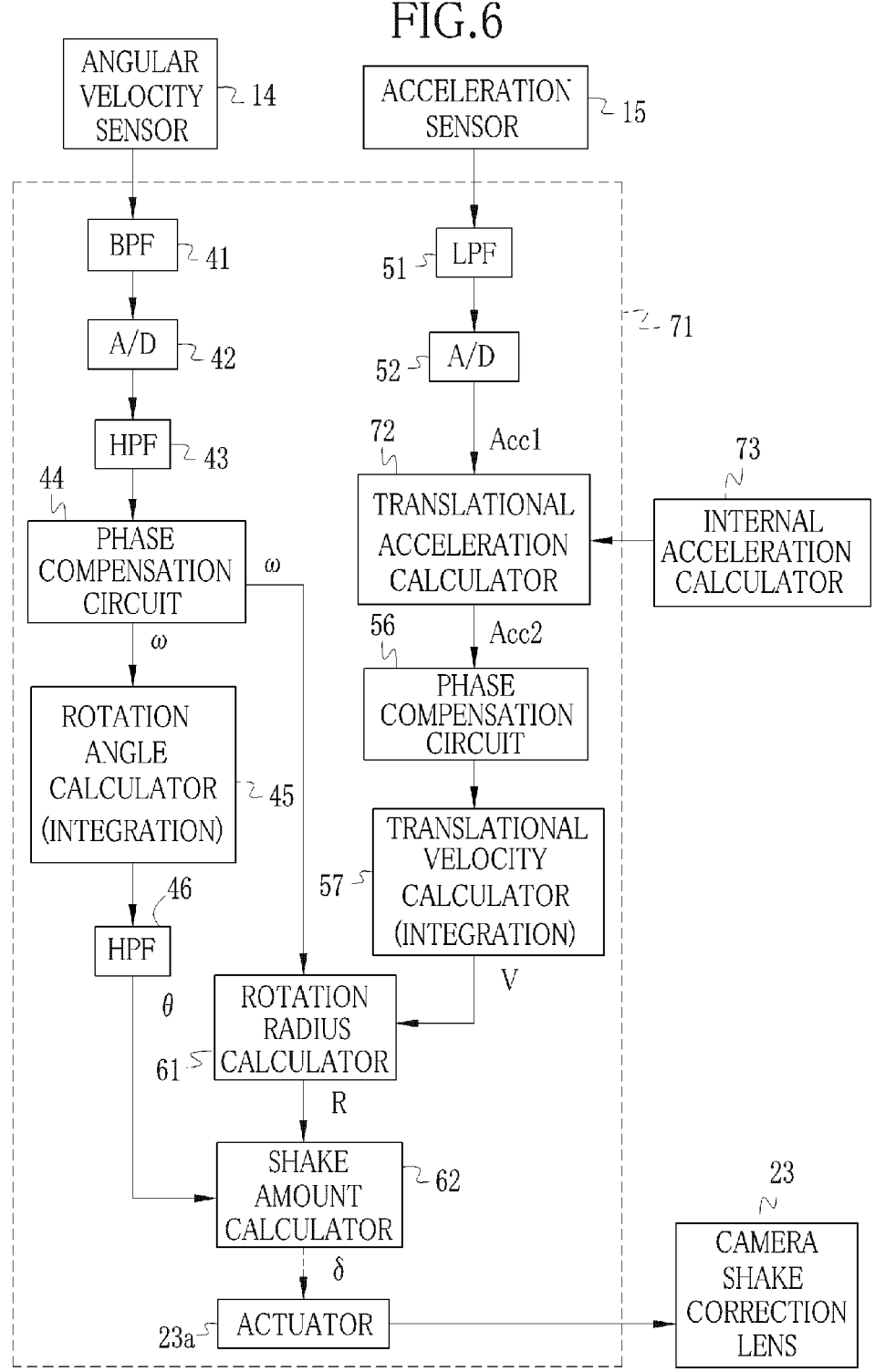
FIG. 6 is a block diagram illustrating a camera shake correction mechanism according to a second embodiment.

FIG. 6 illustrates a camera shake correction mechanism which is not provided with the HPF 53 but which is provided with an internal acceleration calculator 73. A detection signal from the acceleration sensor 15, from which noise is removed by the LPF 51, is converted into a digital signal by the A/D converter 52, and then output as the first translational acceleration Acc1. The first translational acceleration Acc1 is input to a translational acceleration calculator 72. The translational acceleration calculator 72 also receives the internal acceleration from the internal acceleration calculator 73. The translational acceleration calculator 72 calculates the second translational acceleration Acc2 occurring due to the shift camera shake Y by subtracting the internal acceleration from the first translational acceleration Acc1, and then inputs the second translational acceleration Acc2 to the phase compensation circuit 56.

The lens group 21 and the aperture stop 22 are driven by a predetermined particular driving pattern. The internal acceleration calculator 73 calculates the internal acceleration based on the driving pattern of the lens group 21 and the aperture stop 22. For example, in the case where the zooming and focusing of the lens group 21 and the aperture control of the aperture stop 22 are regulated by so-called trapezoidal velocity control, the acceleration at the time of increasing/decreasing the velocity of each of them is input to the translational acceleration calculator 72. According to the trapezoidal velocity control, the movable section such as the stop blade is caused to move while the velocity thereof is increased with a predefined acceleration. When the velocity thereof reaches a specified maximum velocity, the stop blade is caused to move a predetermined distance at the maximum velocity. Thereafter, while the velocity thereof is decreased with a predefined acceleration, the stop blade is caused to move until it arrives at the target position. Accordingly, the internal acceleration calculator 73 obtains information regarding the driving pattern such as the maximum velocity and the moving distance which are specified at the time of driving each of the movable sections (hereinafter referred to as driving pattern) from the CPU 37, and calculates the internal acceleration caused at the time of increasing/decreasing the velocity of each of the movable sections based on the obtained driving pattern.

Figure 7:
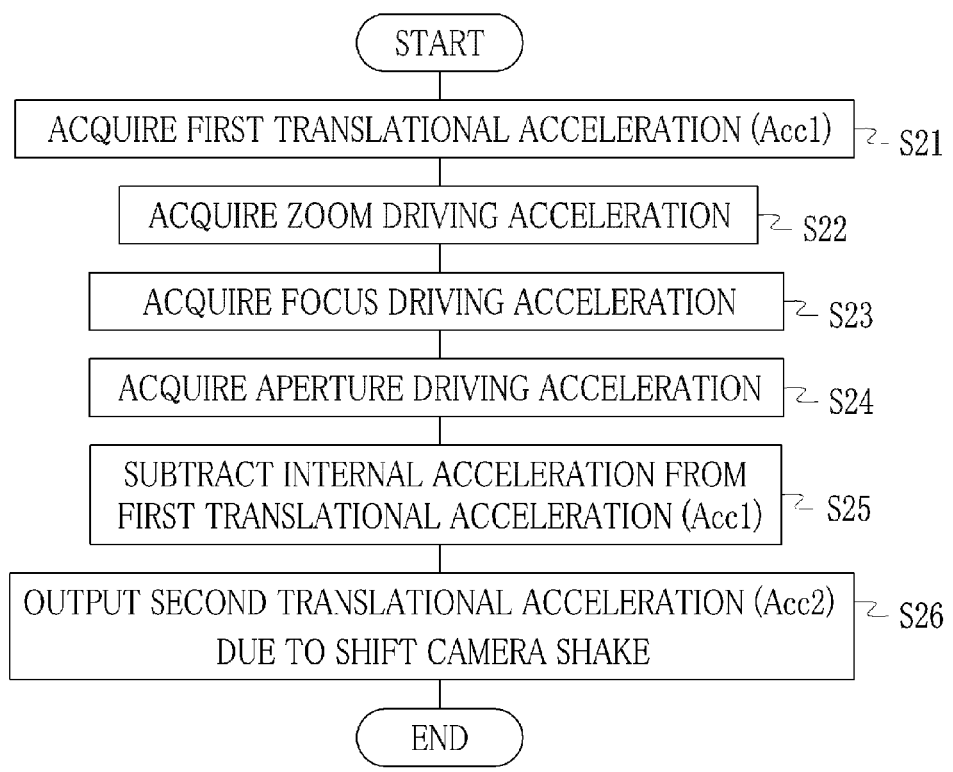
FIG. 7 is a flow chart illustrating a procedure of camera shake correction according to the second embodiment.

In a camera shake corrector 71 having the configuration described above, the translational acceleration calculator 72 calculates the second translational acceleration Acc2 occurring due to the shift camera shake Y as follows. As shown in FIG. 7, the translational acceleration calculator 72 acquires the first translational acceleration Acc1 obtained based on the measurement of the acceleration sensor 15 (step S21). Concurrently, the translational acceleration calculator 72 acquires each of the zoom driving acceleration, focus driving acceleration, and aperture driving acceleration as the internal acceleration from the internal acceleration calculator 73 (steps S22 to S24). Then, each of the zoom driving acceleration, focus driving acceleration, and aperture driving acceleration is subtracted from the first translational acceleration Acc1 (step S25). The second translational acceleration Acc2 obtained by subtracting all the internal accelerations from the first translational acceleration Acc1 is output as the translational acceleration due to the shift camera shake Y.

The rotation radius R is calculated by the rotation radius calculator 61 based on the second translational acceleration Acc2 calculated by the translational acceleration calculator 72 as described above. Next, the camera shake amount δ is calculated by the shake amount calculator 62.

As described above, in the camera shake corrector 71 of the second embodiment, even without using the HPF 53, it is possible to accurately calculate the second translational acceleration Acc2 occurring due to the shift camera shake Y by subtracting all the internal accelerations from the first translational acceleration Acc1 based on the output value of the acceleration sensor 15 by the translational acceleration calculator 72. Thereby, even without using the HPF 53, it is possible to accurately calculate the rotation radius R and the camera shake amount δ while the lens group 21 and the aperture stop 22 operate, and correct the camera shake.

Figure 8A:
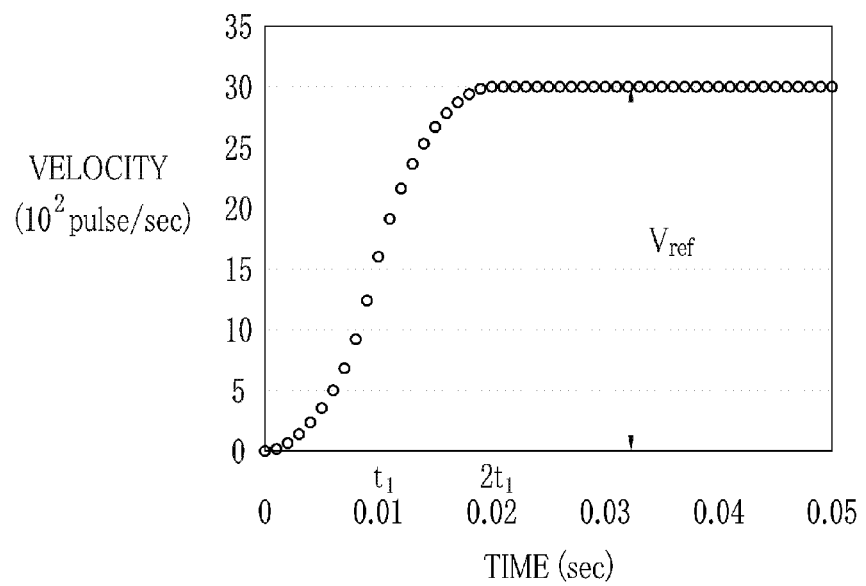
FIG. 8A is a graph illustrating a velocity pattern at the time of acceleration.

For example, the zooming or focusing of the lens group 21 is driven by a stepping motor. In the trapezoidal velocity control of the stepping motor, at the time of starting the rotation of the stepping motor, the velocity thereof is increased as shown in the velocity pattern in FIG. 8A. After the velocity reaches a target velocity $V_{ref}$ at a time $2t_1$, the rotation of the stepping motor is continued while maintaining the target velocity $V_{ref}$. In the velocity pattern, the pulse number of driving the stepping motor is used as a distance.

Figure 8B:
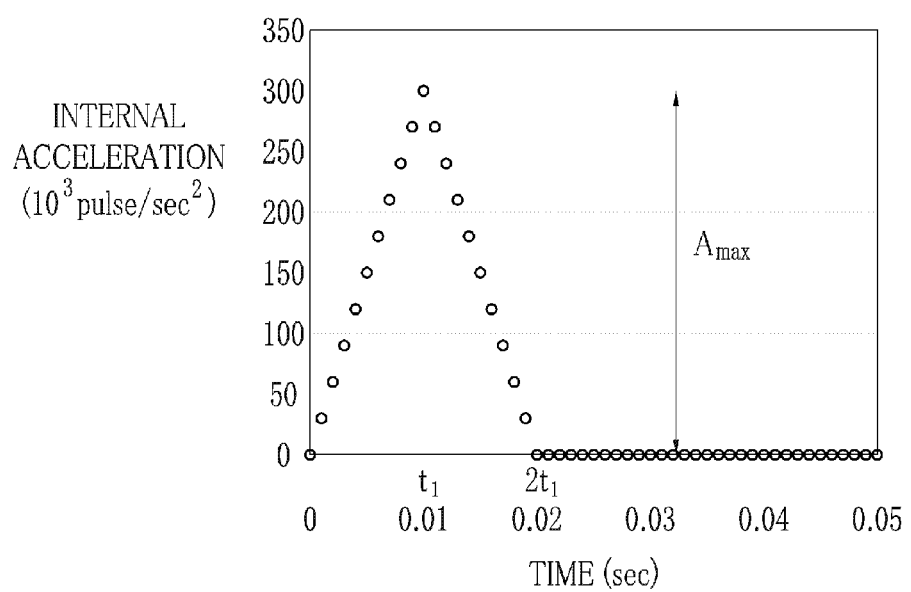
FIG. 8B is a graph illustrating an internal acceleration at the time of acceleration.

The internal acceleration α(t) in accordance with the increase in the velocity of the stepping motor is shown in FIG. 8B. The internal acceleration α(t) changes in accordance with the time t, and expressed by the following mathematical expression. Here, a relationship expressed by $A_{max}=V_{ref}/t_1$ is established.

When $0 \leq t \leq t_1$ is satisfied, α(t) equals to $(A_{max}/t_1) \times t$.

$$\alpha(t)=(A_{max}/t_1) \times t$$

When $t_1 < t \leq 2t_1$ is satisfied, α(t) equals to $(A_{max}/t_1) \times t + 2A_{max}$.

$$\alpha(t)=(A_{max}/t_1) \times t + 2A_{max}$$

When $2t_1 < t$ is satisfied, α(t) equals to 0.

$$\alpha(t)=0$$

Figure 9A:
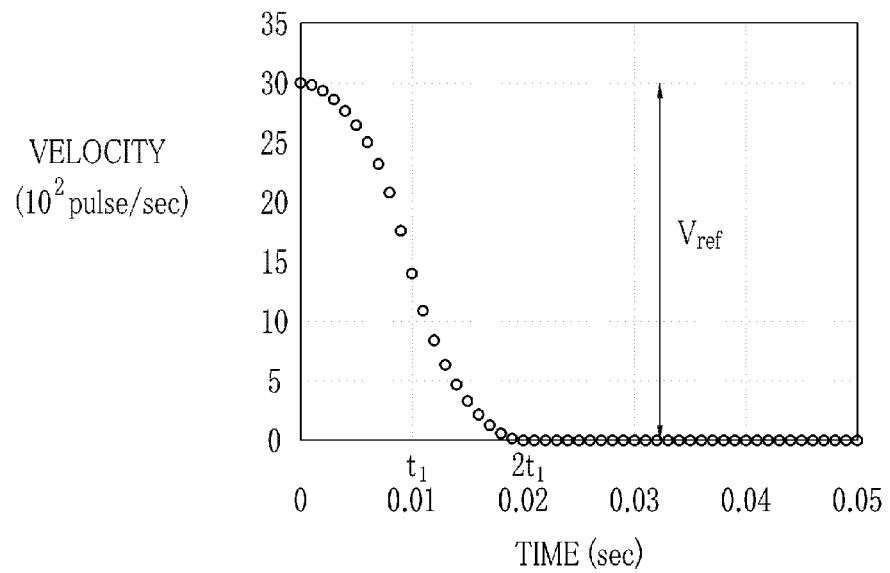
FIG. 9A is a graph illustrating a velocity pattern at the time of deceleration.
Figure 9B:
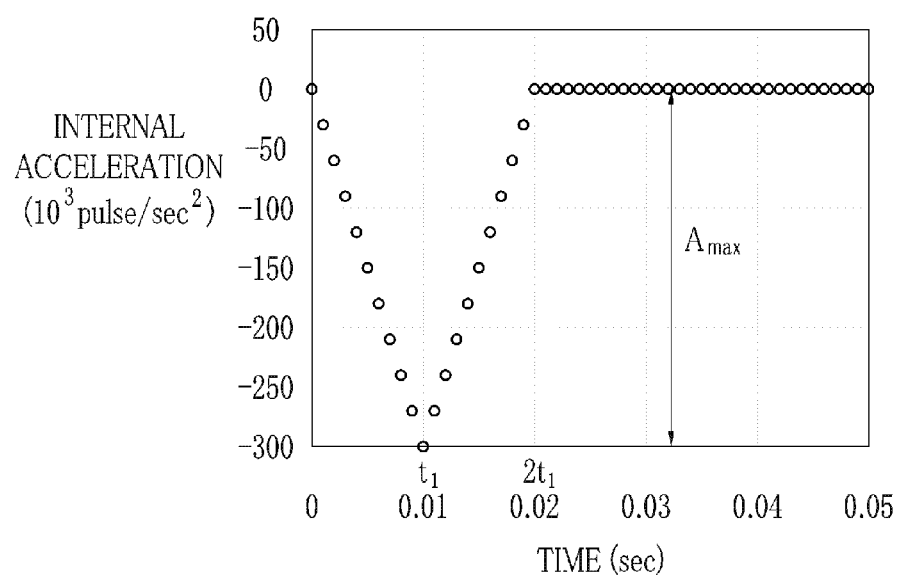
FIG. 9B is a graph illustrating an internal acceleration at the time of deceleration.

The velocity of the stepping motor is increased, and then the stepping motor is caused to rotate at a predetermined velocity. When the stepping motor approaches the target position, the velocity thereof is decreased, and the rotation of the stepping motor is stopped, as shown in FIG. 9A. The internal acceleration α(t) at the time of the decreasing the velocity of the stepping motor is shown in FIG. 9B. The internal acceleration α(t) is expressed by the following mathematical expression. Here, V denotes the velocity of the stepping motor at the time of starting deceleration, and a relationship expressed by $A_{max}=V_{ref}/t_1$ is established.

When $0 \leq t \leq t_1$ is satisfied, α(t) equals to $-(A_{max}/t_1) \times t$.

$$\alpha(t)=-(A_{max}/t_1) \times t$$

When $t_1 < t \leq 2t_1$ is satisfied, α(t) equals to $(A_{max}/t_1) \times t - 2A_{max}$.

$$\alpha(t)=(A_{max}/t_1) \times t - 2A_{max}$$

When $2t_1 < t$ is satisfied, α(t) equals to 0.

$$\alpha(t)=0$$

According to the above second embodiment, the internal acceleration calculator 73 calculates the internal acceleration due to the operation of the lens group 21 or the aperture stop 22. Alternatively, similarly to the first embodiment, the translational acceleration calculator 72 may calculate each of the internal accelerations based on the pieces of information P1, P2, and P3, and the like.

According to the second embodiment, the operation of the lens group 21 or the aperture stop 22 is controlled by the trapezoidal velocity control. However, the lens group 21 or the aperture stop 22 may operate based on a cubic or higher-order spline function, for example. The specific shape of the spline function (namely, specific trajectory of the lens group 21 or the aperture stop 22) is defined based on the current position of each of the movable sections, the target position, and one or more positions on the route through which each of the movable sections is supposed to pass (one or more designated positions). Therefore, in the case where the lens group 21 or the aperture stop 22 is driven based on the spline function, the internal acceleration calculator 73 acquires the information including the current position of each of the movable sections, the target position, and the designated positions, so as to calculate the spline function of each of the movable sections. Each of the obtained spline functions is differentiated twice to calculate the internal acceleration of each of the movable sections. Note that in the case where the lens group 21 or the aperture stop 22 is driven based on the spline function, it is necessary to use the cubic or higher-order spline function such that the second-order differentiation is available. Further, in order to make it easy to define the shape of the spline function, it is preferable that the lens group 21 or the aperture stop 22 is driven based on the spline function of as low-order as possible. Accordingly, the cubic spline function is preferably used.

The cubic spline function $S_j(x)$ showing a curve line of an interval from $X_j$ to $X_{j+1}$ is expressed by the following mathematical expression, for example.

$$S_j(x)=a_j(x-x_j)^3+b_j(x-x_j)^2+c_j(x-x_j)+d_j$$

Here, the internal acceleration is expressed by the following mathematical expression.

$$\alpha(t)=6a_j(x-x_j)+2b_j$$

Note that, j=0, 1, 2, . . . , N−1.

The trapezoidal velocity control is preferably used when the lens group 21 or the like is driven by the stepping motor. Further, the control based on the spline function or the quintic function in the mathematical expression 1 is preferable when the voice coil motor (VCM) or a DC motor is used. Accordingly, the magnification lens may be controlled by the spline function using the DC motor, and the focusing lens may be controlled by the trapezoidal velocity control using the stepping motor or the spline function using the voice coil motor. As described above, in the case where each of the movable sections in the image pickup apparatus 10 is controlled by a different mode, the above second embodiment and modified embodiments thereof may be combined arbitrarily. In any case, it is sufficient that the internal acceleration is subtracted from the first translational acceleration Acc1 based on the output value of the acceleration sensor 15 in the translational acceleration calculator 72. The same holds true for the first embodiment in which the translational acceleration calculator 55 acquires the information of the internal acceleration from the AF detection circuit 16, the AE/AWB detection circuit 17, the CPU 37, or the like as described above.

According to the above first and second embodiments, the imaging optical system includes the camera shake correction lens 23, and the camera shake correction lens 23 is caused to move in the plane vertical to the optical axis L, so as to correct the camera shake. Additionally, it is also possible to correct the camera shake by moving the imaging device 12 along the imaging surface or moving the whole imaging optical system.

The internal acceleration occurs due to a factor other than the lens unit 11*a*. For example, in the case where an internal acceleration occurs by driving a mirror for the focusing or a lens device disposed in an optical path of the viewfinder, or other movable sections, it is sufficient that the internal acceleration is subtracted from the translational acceleration Acc1.

Note that the imaging device may be a CMOS image sensor instead of the CCD image sensor.

What is claimed is:

1. An image pickup apparatus having an imaging device disposed on an imaging optical axis, an imaging optical system for forming an image of a subject on said imaging device, and a movable section that causes an internal acceleration during operation thereof, said image pickup apparatus comprising:
    an angular velocity detector for detecting an angular velocity in accordance with rotation of said image pickup apparatus;
    an acceleration detector for detecting a first translational acceleration in accordance with translational movement of said image pickup apparatus;
    a translational acceleration calculator for calculating a second translational acceleration caused by an external factor on said image pickup apparatus by subtracting said internal acceleration from said first translational acceleration;
    a translational velocity calculator for calculating a translational velocity by integrating said second translational acceleration;
    a rotation radius calculator for calculating a rotation radius based on said angular velocity and said translational velocity;
    a rotation angle calculator for calculating a rotation angle by integrating said angular velocity;
    a shake amount calculator for calculating a camera shake amount containing an angle camera shake and an shift camera shake based on said rotation angle and said rotation radius, said angle camera shake occurring due to rotation of said imaging optical axis, and said shift camera shake occurring due to parallel shifting of said imaging optical axis; and
    a driver for moving said imaging optical system as a whole or an optical component constituting said imaging optical system, or moving said imaging device, in a direction for canceling said camera shake amount, so as to correct said angle camera shake and said shift camera shake.

2. The image pickup apparatus of claim 1, further comprising a high-pass filter for removing a component of a gravitational acceleration from said first translational acceleration, wherein
    said translational acceleration calculator compares a frequency component of said internal acceleration with a cut-off frequency of said high-pass filter, and outputs said first translational acceleration as said second translational acceleration without subtracting said internal acceleration from said first translational acceleration when said frequency component of said internal acceleration is lower than said cut-off frequency, and outputs a value obtained by subtracting said internal acceleration from said first translational acceleration as said second translational acceleration when said frequency component of said internal acceleration is higher than said cut-off frequency.

3. The image pickup apparatus of claim 1, wherein said translational acceleration calculator acquires position information of said movable section during the operation of said movable section, and differentiates said position information twice, so as to calculate said internal acceleration.

4. The image pickup apparatus of claim 1, further comprising an internal acceleration calculator for calculating said internal acceleration based on a predetermined driving pattern for driving said movable section.

5. The image pickup apparatus of claim 4, wherein
    said driving pattern is defined based on trapezoidal velocity control, and
    said internal acceleration calculator calculates said internal acceleration based on a parameter for determining an aspect of said trapezoidal velocity control.

6. The image pickup apparatus of claim 4, wherein
    said driving pattern is defined based on a cubic or higher-order spline function, and
    said internal acceleration calculator calculates said internal acceleration by differentiating said spline function twice.

7. The image pickup apparatus of claim 4, wherein
    said driving pattern is defined based on the following quintic function expressed by using an initial position $x_0$, a target position $x_f$, a time t, and a target arrival time $t_f$, and
    said internal acceleration calculator calculates said internal acceleration by differentiating the following quintic function twice $$x(t) = x_0 - 6\frac{x_0 - x_f}{t_f^5}t^5 + 15\frac{x_0 - x_f}{t_f^4}t^4 - 10\frac{x_0 - x_f}{t_f^3}t^3.$$

8. The image pickup apparatus of claim 1, wherein said movable section is a component of said imaging optical system.

9. The image pickup apparatus of claim 8, wherein said movable section is a magnification lens moved along said imaging optical axis at the time of zooming, or a lens driving mechanism for driving said magnification lens.

10. The image pickup apparatus of claim 8, wherein said movable section is a focusing lens moved along said imaging optical axis at the time of focusing, or a lens driving mechanism for driving said focusing lens.

11. The image pickup apparatus of claim 8, wherein said movable section is an aperture stop device for forming an aperture opening on said imaging optical axis by plural stop blades at the time of adjusting an exposure amount, or an aperture driving mechanism for moving said stop blades.

12. The image pickup apparatus of claim 1, wherein said movable section is an optical component movable in an optical path of a viewfinder.

13. The image pickup apparatus of claim 1, wherein said shake amount calculator acquires an image magnification and a focal length, and calculates said camera shake amount by using said image magnification, said focal length, said rotation angle, and said rotation radius.

14. The image pickup apparatus of claim 1, wherein said driver corrects said angle camera shake and said shift camera shake by driving a camera shake correction lens contained in said imaging optical system.

* * * * *